United States Patent
Maghsoodi et al.

(10) Patent No.: US 11,254,549 B2
(45) Date of Patent: Feb. 22, 2022

(54) HOIST TRANSLATING DRUM WITH BAR SPLINE BEARING

(71) Applicant: GOODRICH CORPORATION, Charlotte, NC (US)

(72) Inventors: Bejan Maghsoodi, San Dimas, CA (US); Domenic Dezan, Upland, CA (US)

(73) Assignee: Goodrich Corporation, Charlotte, NC (US)

( * ) Notice: Subject to any disclaimer, the term of this patent is extended or adjusted under 35 U.S.C. 154(b) by 229 days.

(21) Appl. No.: 16/431,198

(22) Filed: Jun. 4, 2019

(65) Prior Publication Data

US 2020/0385249 A1    Dec. 10, 2020

(51) Int. Cl.
| | |
|---|---|
| *B66D 1/14* | (2006.01) |
| *A62B 1/06* | (2006.01) |
| *B66D 1/39* | (2006.01) |
| *B64D 1/22* | (2006.01) |

(52) U.S. Cl.
CPC ............... *B66D 1/14* (2013.01); *A62B 1/06* (2013.01); *B64D 1/22* (2013.01); *B66D 1/39* (2013.01); *B66D 2700/0191* (2013.01)

(58) Field of Classification Search
CPC .... B66D 1/39; B66D 1/14; B66D 2700/0191; A62B 1/06; B64D 1/22; B64C 27/04
See application file for complete search history.

(56) References Cited

U.S. PATENT DOCUMENTS

| | | | | |
|---|---|---|---|---|
| 1,962,670 | A | * | 6/1934 | Labora ..................... B66D 1/39 |
| | | | | 242/399.1 |
| 2,324,329 | A | * | 7/1943 | Shoffnerjohnr .......... B66D 1/02 |
| | | | | 242/483.5 |
| 3,581,834 | A | * | 6/1971 | Kellner .................... E21B 17/07 |
| | | | | 175/321 |
| 3,836,121 | A | | 9/1974 | Jones |
| 4,087,060 | A | * | 5/1978 | Laky ................... B65H 54/2803 |
| | | | | 242/399.1 |
| 2017/0166422 | A1 | | 6/2017 | Mahnken |
| 2017/0203939 | A1 | | 7/2017 | Hamann et al. |
| 2017/0267503 | A1 | * | 9/2017 | Mahnken ................ B66D 1/14 |
| 2018/0251351 | A1 | | 9/2018 | Ijadi-Maghsoodi et al. |

\* cited by examiner

*Primary Examiner* — Sang K Kim
*Assistant Examiner* — Nathaniel L Adams
(74) *Attorney, Agent, or Firm* — Snell & Wilmer L.L.P.

(57) ABSTRACT

A hoist is disclosed. In various embodiments, the hoist includes a torque tube defining a longitudinal axis and having a radially outer surface; a cable drum having a radially inner surface; and a bar spline disposed radially outward of the torque tube and radially inward of the cable drum and configured to transfer a torque from the torque tube to the cable drum.

9 Claims, 6 Drawing Sheets

HOIST TRANSLATING DRUM WITH BAR SPLINE BEARING

FIELD

The present disclosure relates generally to hoists and, more particularly, to rescue hoists having cable drums configured to translate on linear bearings.

BACKGROUND

A rescue hoist deploys and retrieves a cable from a cable drum to hoist persons or cargo. The hoist may be mounted to an aircraft, such as, for example, a helicopter, and is utilized to hoist the persons or the cargo to safety or to deploy the same to the ground or to a ship or similar platform. A rescue hoist typically includes a cable drum, off of which the cable is deployed, and a level wind mechanism for level winding the cable across a length of the cable drum to prevent fouling of the cable and to prevent the cable from experiencing extraneous loads beyond those imparted by the weight of the persons or the cargo. For example, unless accounted for, the portion of the cable outside of the rescue hoist may experience side loads due to the rotation or swaying of the load being hoisted, with the side loads being transmitted to the rescue hoist.

Typically, a rescue hoist will fall within one of two categories or configurations. A category one hoist includes a translating drum, where the translating drum functions as the level winding mechanism. The category one hoist allows for the cable to be deployed through a single point in a hoist housing, thereby dispersing side loads from the cable to the structure of the hoist. Category one hoists use very precise, high-quality spur drivetrains with the drivetrains being mounted separate from the translating drums. A category two hoist, on the other hand, typically includes a stationary drum with the drivetrain mounted within the drum. The category two hoist, in contrast with the category one hoist, includes a translating level wind mechanism that shuttles in a reciprocating manner across a length of the drum to level wind the cable onto the drum.

SUMMARY

A hoist is disclosed. In various embodiments, the hoist includes a torque tube defining a longitudinal axis and having a radially outer surface; a cable drum having a radially inner surface; and a bar spline disposed radially outward of the torque tube and radially inward of the cable drum and configured to transfer a torque from the torque tube to the cable drum.

In various embodiments, the bar spline includes a mount attached to the radially outer surface of the torque tube. In various embodiments, the bar spline includes a race surface disposed at a radially inner surface of the cable drum. In various embodiments, the bar spline includes a rod extending parallel to the longitudinal axis. In various embodiments, the bar spline is a first bar spline from among a plurality of bar splines spaced about the radially outer surface of the torque tube and the race surface is a first race surface from among a plurality of race surfaces spaced about the radially inner surface of the cable drum.

In various embodiments, the bar spline includes a rod secured to a mount attached to the radially inner surface of the cable drum. In various embodiments, the radially outer surface of the torque tube includes a race surface configured to slidably engage the rod.

In various embodiments, a level wind mechanism is configured to translate the cable drum back and forth with respect to the longitudinal axis, the level wind mechanism including a first screw and a second screw. In various embodiments, the first screw and the second screw are secured to the radially outer surface of the torque tube. In various embodiments, a follower is threadedly engaged with the first screw and the second screw and coupled to the radially inner surface of the cable drum. In various embodiments, the bar spline includes a rod secured to a mount attached to at least one of the radially outer surface of the torque tube and the radially inner surface of the cable drum. In various embodiments, at least one of the radially outer surface of the torque tube and the radially inner surface of the cable drum includes a race surface configured to slidably engage the rod.

A method of hoisting a cable is disclosed. In various embodiments, the method includes the steps of: engaging a radially outer surface of a torque tube with a radially inner surface of a cable drum using a bar spline disposed radially outward of the torque tube and radially inward of the cable drum; and transferring a torque from the torque tube to the cable drum via the bar spline to wind or unwind the cable disposed about the cable drum.

In various embodiments, the method includes translating the cable drum back and forth with respect to a longitudinal axis via a level wind mechanism having a first screw and a second screw secured to the radially outer surface of the torque tube. In various embodiments, a follower is threadedly engaged with the first screw and the second screw and coupled to the radially inner surface of the cable drum. In various embodiments, the bar spline includes a rod secured to a mount attached to at least one of the radially outer surface of the torque tube and the radially inner surface of the cable drum. In various embodiments, at least one of the radially outer surface of the torque tube and the radially inner surface of the cable drum includes a race surface configured to slidably engage the rod.

A rescue hoist is disclosed. In various embodiments, the rescue hoist includes a torque tube defining a longitudinal axis and having a radially outer surface; a cable drum having a radially inner surface; a bar spline disposed radially outward of the torque tube and radially inward of the cable drum and configured to transfer a torque from the torque tube to the cable drum; and a level wind mechanism configured to translate the cable drum back and forth with respect to the longitudinal axis.

In various embodiments, the bar spline includes a rod secured to a mount attached to at least one of the radially outer surface of the torque tube and the radially inner surface of the cable drum. In various embodiments, at least one of the radially outer surface of the torque tube and the radially inner surface of the cable drum includes a race surface configured to slidably engage the rod.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
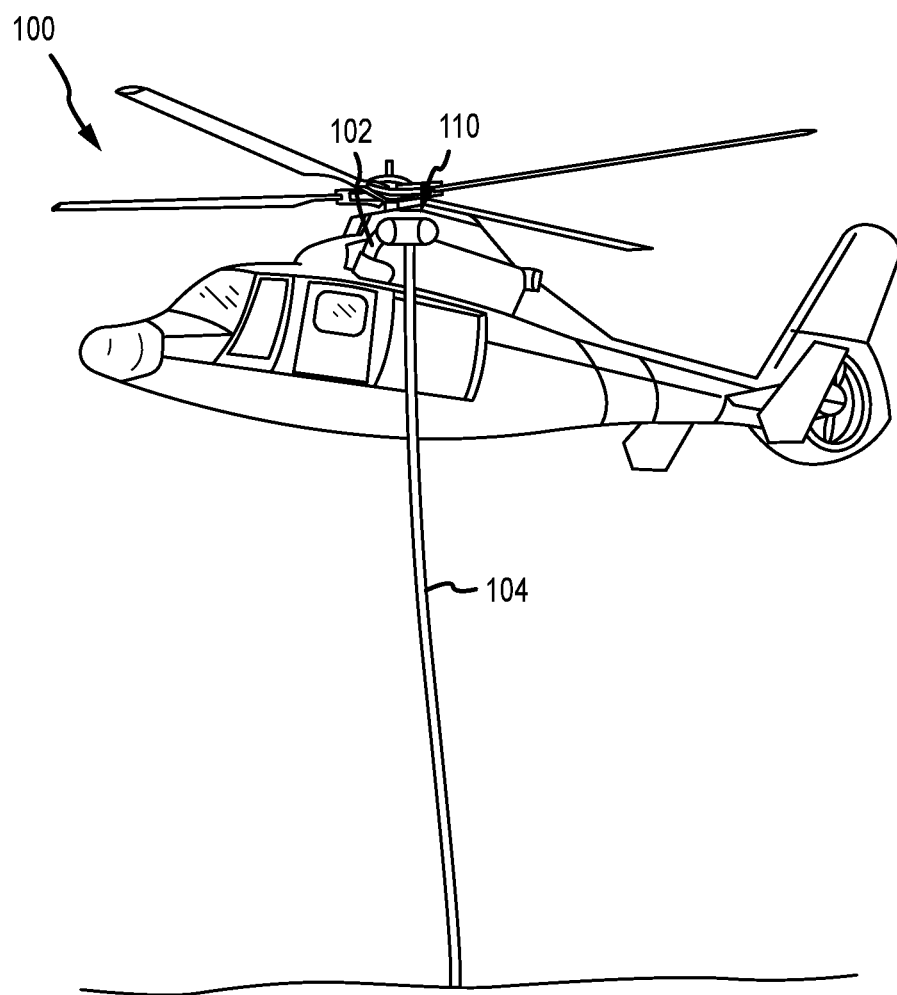
FIG. 1A is an elevation view of an aircraft and a rescue hoist, in accordance with various embodiments.
Figure 1B:
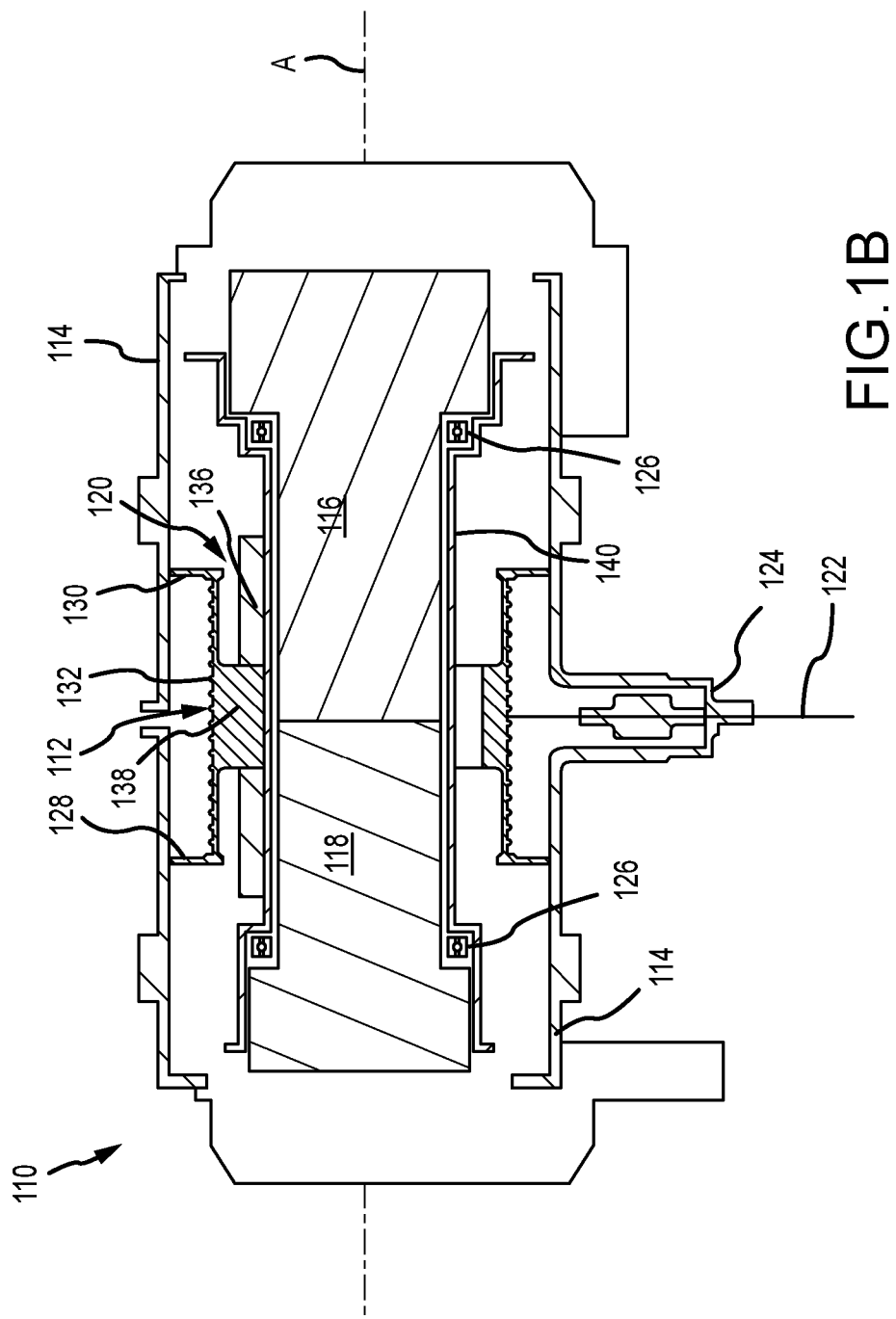
FIG. 1B is a schematic view of a rescue hoist, in accordance with various embodiments.

Referring now to the drawings, FIG. 1A provides a perspective view of an aircraft 100 and a rescue hoist 110 mounted to the aircraft 100, while FIG. 1B provides a cross-sectional view of the rescue hoist 110, in accordance with various embodiments. The rescue hoist 110 is mounted to the aircraft 100 by a support frame 102 and a cable 104 extends from the rescue hoist 110. Referring more specifically to FIG. 1B, in various embodiments, the rescue hoist 110 includes, among other components, a cable drum 112, a frame 114, a motor 116, a drive train 118, a level wind mechanism 120, a cable 122, a cable guide 124 and a support bearing 126 about which a torque tube 140 may be configured to rotate. The cable drum 112 includes a first radial flange 128, a second radial flange 130 and a barrel 132 extending axially between the first radial flange 128 and the second radial flange 130. The level wind mechanism 120 includes a screw 136 (or a plurality screws) and a follower 138 coupled to the cable drum 112. In various embodiments, the screw 136 is fixed to the frame 114, such that when the screw 136 rotates, the follower 138, together with the cable drum 112 to which the follower 138 is connected, translates back and forth with respect to a longitudinal axis A.

Figure 2A:
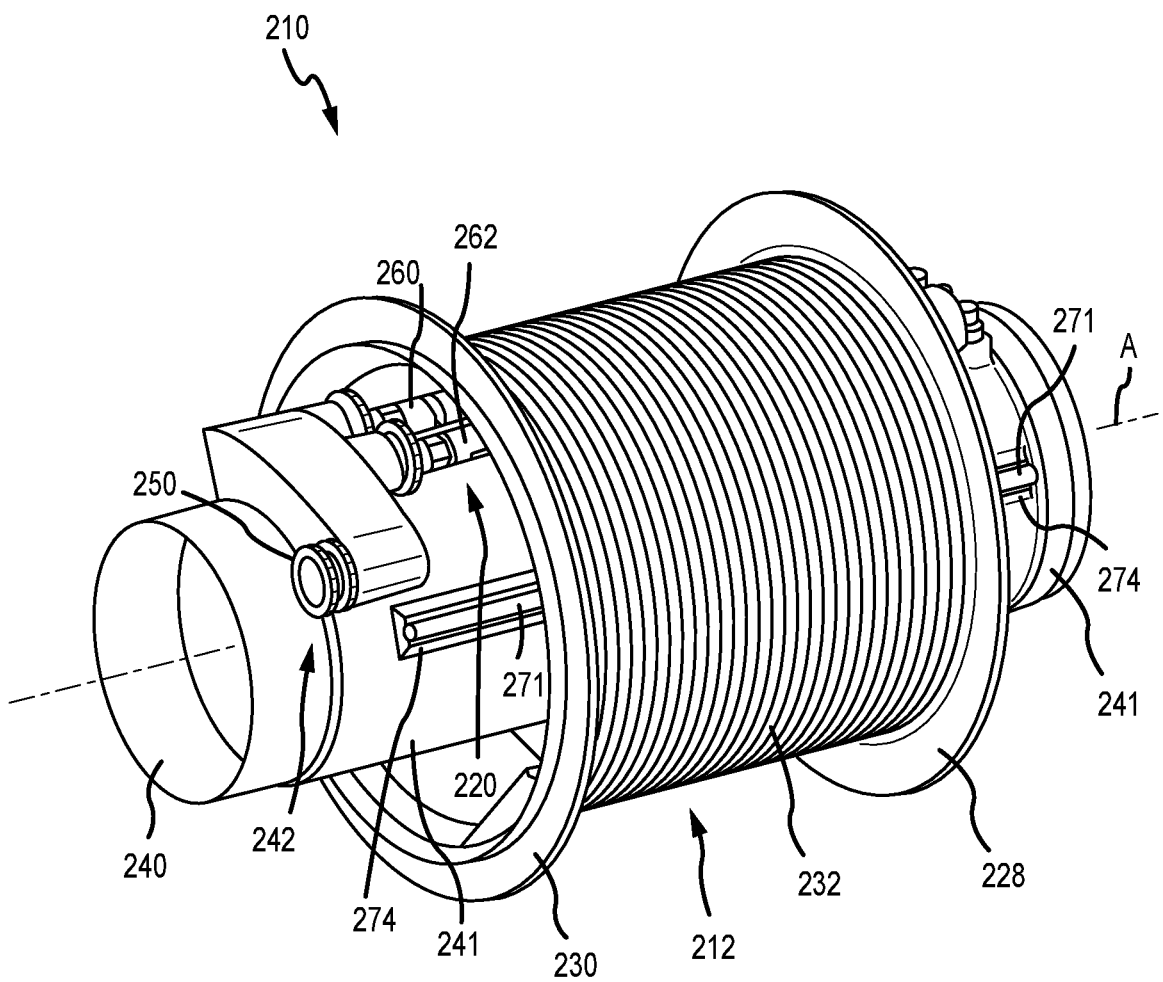
FIG. 2A is a perspective schematic view of various internal components of a rescue hoist, in accordance with various embodiments.
Figure 2B:
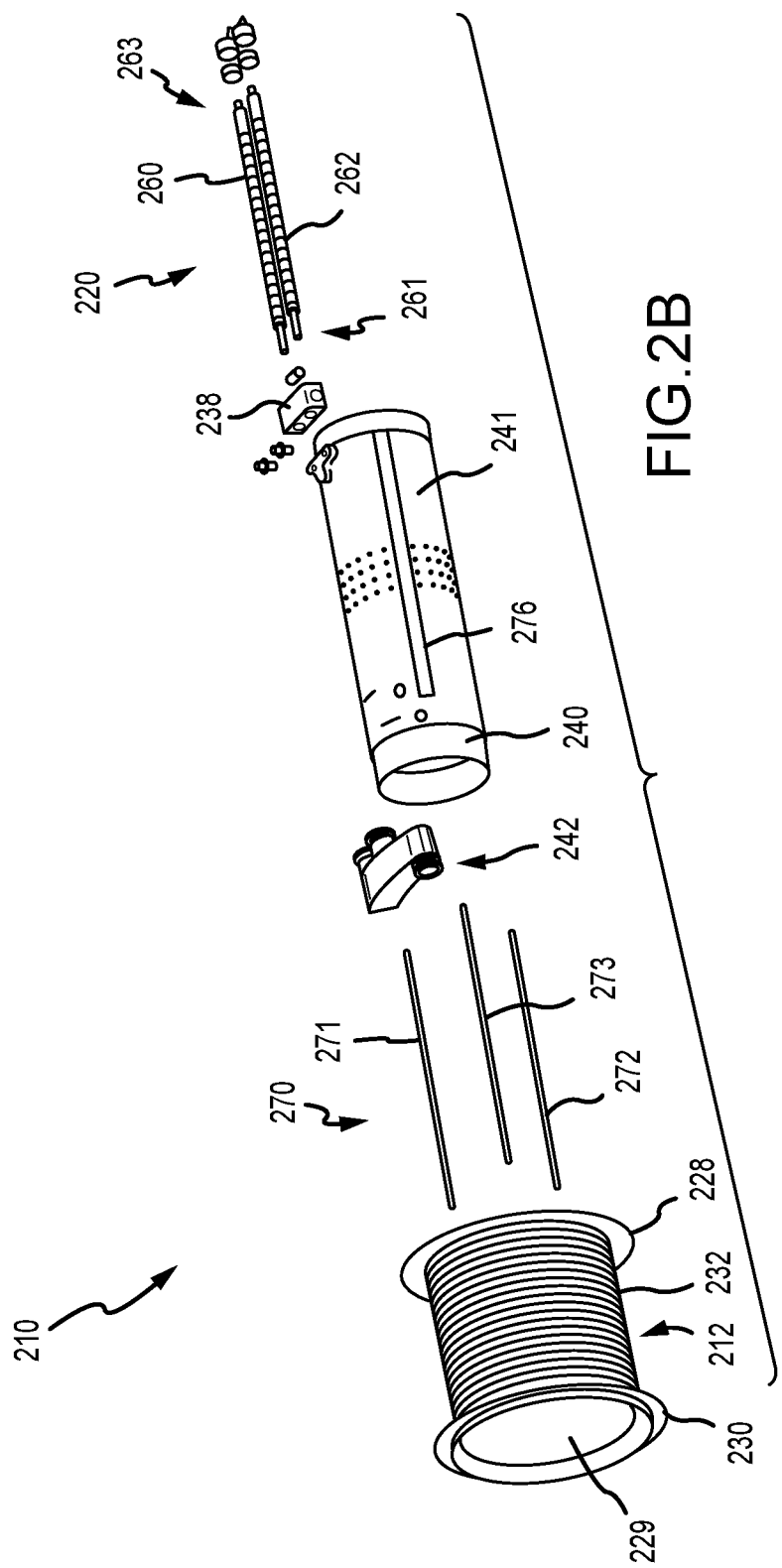
FIG. 2B is an exploded schematic view of various internal components of a rescue hoist, in accordance with various embodiments.
Figure 2C:
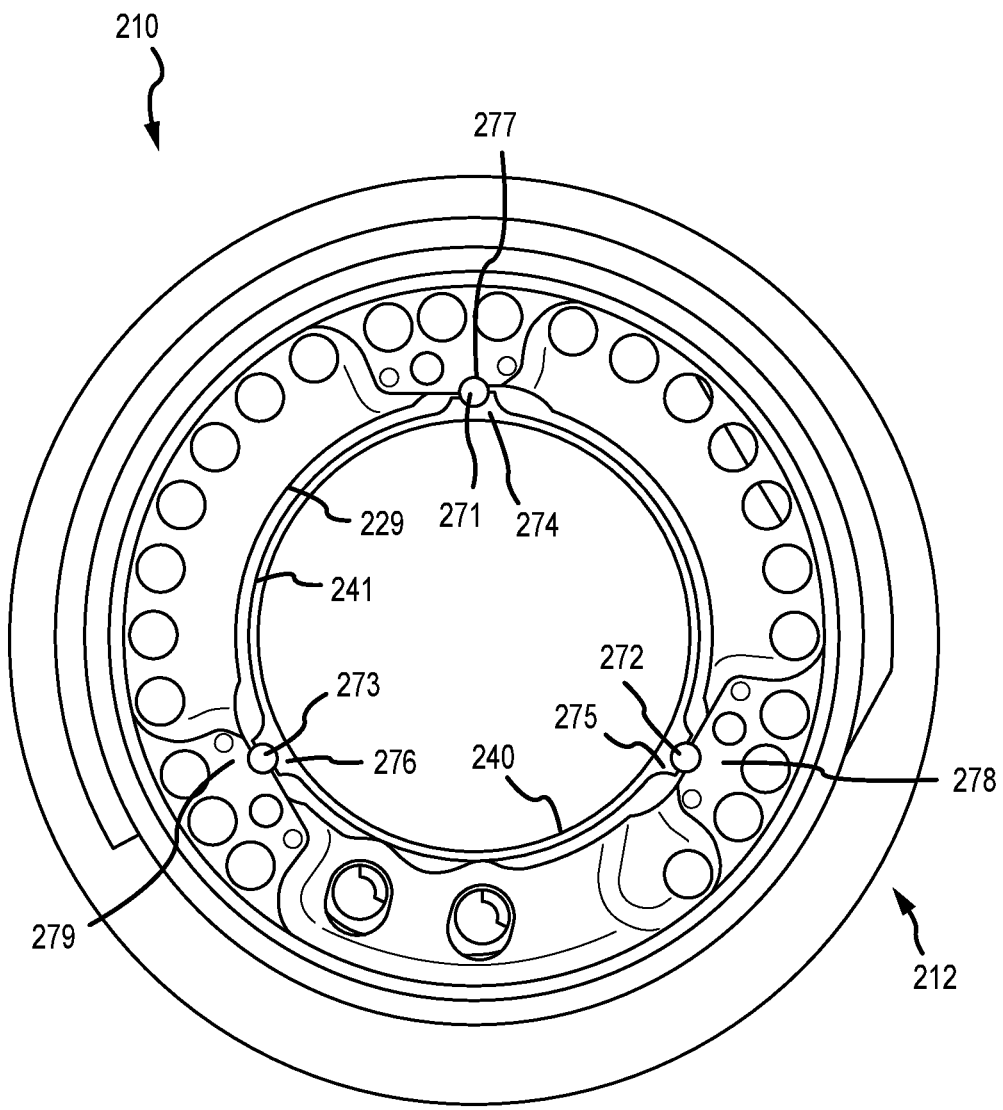
FIG. 2C is a side schematic view of various internal components of a rescue hoist, in accordance with various embodiments.

Referring now to FIGS. 2A, 2B and 2C, perspective, exploded and side schematic views of various components of a rescue hoist 210, similar to the rescue hoist 110 described above with reference to FIG. 1B, are provided. Referring to the various drawings, the rescue hoist 210 includes a cable drum 212, having a first radial flange 228, a second radial flange 230 and a barrel 232 extending axially between the first radial flange 228 and the second radial flange 230. In various embodiments, the cable drum 212 is disposed radially outward of a torque tube 240, within which a motor and a drive mechanism may be at least partially housed. In various embodiments, both the torque tube 240 and the cable drum 212 are configured to rotate about a longitudinal axis A. As described above with respect to FIG. 1B, the cable drum 212 is also configured to translate back and forth with respect to the longitudinal axis A.

Still referring to FIGS. 2A-2C, the rescue hoist 210 includes a speed reduction mechanism 242, which may, in various embodiments, include or be coupled to a planetary gear 250 configured to be driven by a ring gear disposed radially outward of the torque tube 240 and driven by a motor and a drive train, such as, for example, the motor 116 and the drive train 118 described above with reference to FIG. 1B. The speed reduction mechanism 242 may also be coupled to a level wind mechanism 220, similar to the level wind mechanism 120 described above with reference to FIG. 1B. In various embodiments, the level wind mechanism 220 includes a first screw 260 and a second screw 262, both screws extending axially along a radially outer surface 241 of the torque tube 240 and being mounted thereto at first ends 261 and second ends 263 of the screws. The first screw 260 and the second screw 262 are coupled to and driven by the speed reduction mechanism 242. The level wind mechanism 220 further includes a follower 238, similar to the follower 138 described above with reference to FIG. 1B, coupled to a radially inner surface 229 of the cable drum 212. The follower 238 includes threaded openings that engage the first screw 260 and the second screw 262, such that the follower 238 translates back and forth with respect to the longitudinal axis A as the screws turn, thereby causing the cable drum 212 to also translate back and forth with respect to the longitudinal axis A.

Still referring to FIGS. 2A-2C, the rescue hoist 210 includes one or more bar splines 270 (or a plurality of bar splines). In various embodiments, each of the one or more bar splines 270 comprises a rod, such as, for example, a first rod 271, a second rod 272 and a third rod 273 disposed in a mounting structure connected to the radially outer surface 241 of the torque tube 240. For example, as illustrated in FIGS. 2A-2C, a first mount 274 is attached to the torque tube 240 and configured to receive the first rod 271. A second mount 275 and a third mount 276 are likewise attached to the torque tube 240 and configured to receive the second rod 272 and the third rod 273, respectively. In various embodiments, the one or more bar splines 270 may be spaced equidistantly about the radially outer surface 241 of the torque tube 240 as illustrated, for example, in FIGS. 2A-2C. In similar fashion, the radially inner surface 229 of the cable drum 212 may include a first race surface 277 configured to slidably engage the first rod 271. In various embodiments, the first race surface 277 may extend axially along the length of the barrel 232 or be segmented along the length of the barrel 232. A second race surface 278 and a third race surface 279 (providing a plurality of race surfaces) are likewise included within or otherwise attached to the radially inner surface 229 of the cable drum 212 and configured to slidably engage the second rod 272 and the third rod 273, respectively. As described above, the one or more bar splines 270 are configured to transfer a torque from the torque tube 240 to the cable drum 212, such that the cable drum 212 rotates together with the torque tube 240 about the longitudinal axis A.

Note that while the foregoing describes the rods comprised with the one or more bar splines 270 as being disposed in mounting structure connected to the torque tube 240, thus fixing the rods with respect to the torque tube 240, with the cable drum 212 sliding along the rods, the disclosure contemplates the reverse situation. In other words, the disclosure contemplates the rods comprised with the one or more bar splines 270 being disposed within mounting structure connected to the cable drum 212, thus fixing the rods with respect to the cable drum 212, with the torque tube 240 sliding along the rods. Further, while the disclosure refers to rods having generally circular cross section, the disclosure contemplates rods having other cross sectional geometries, such as, for example, triangular, square or general N-pentagonal cross sectional geometries. Consistent with the foregoing, the disclosure also contemplates the race surface described above will generally comprise a cross sectional geometry that will slidingly engage and surround a portion of the perimeter defined by the rod having the various cross sectional geometries described above—e.g., the race surface may also be defined as having, for example, circular, triangular, square or general N-pentagonal cross sectional geometries, or at least a portion thereof, sufficient to engage a portion of the surface of the rod. In various embodiments, then, the rod need not be completely surrounded by bushings or bearings but, rather, need only be restrained from movement in the radial direction by the mount and the race, either of which may be disposed on either the radially outer surface of the torque tube or the radially inner surface of the cable drum.

Figure 3:
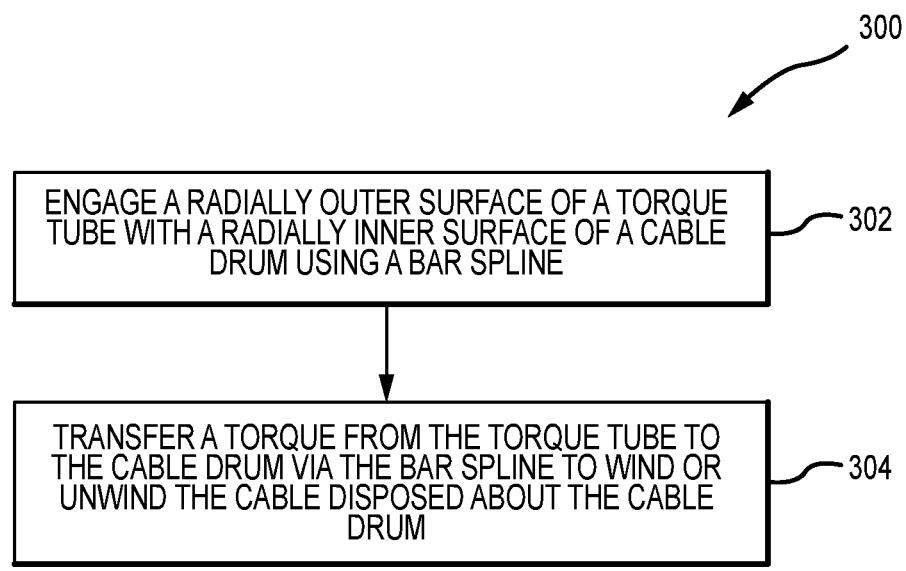
FIG. 3 is a flowchart describing a method of hoisting a cable.

Referring now to FIG. 3, a method 300 of hoisting a cable is described. In accordance with various embodiments, a first step 302 includes engaging a radially outer surface of a torque tube with a radially inner surface of a cable drum using a bar spline disposed radially outward of the torque tube and radially inward of the cable drum. A second step 304 includes transferring a torque from the torque tube to the cable drum via the bar spline to wind or unwind the cable disposed about the cable drum. In various embodiments, the method further comprises translating the cable drum back and forth with respect to a longitudinal axis via a level wind mechanism having a first screw and a second screw secured to the radially outer surface of the torque tube.

A hoist having a bar spline disposed between a torque tube and a cable drum is described above. Among other benefits, the bar spline reduces drawbacks that may arise through use of more traditional recirculating ball bearings or ball splines. The bar spline disclosed herein also provides axial damping of the hoist in vibratory environments and may be configured to transfer torque along the entire axial length of the cable drum or the torque tube. The bar spline may also be fabricated relatively simply using materials such as, for example, aluminum or aluminum alloys, rather than hardened or plated steel.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:
1. A hoist, comprising:
a torque tube defining a longitudinal axis and having a radially outer surface and an axial length;
a cable drum having a radially inner surface; and
a bar spline disposed radially outward of the torque tube and radially inward of the cable drum and configured to transfer a torque from the torque tube to the cable drum, wherein the bar spline includes a mount attached to the radially outer surface of the torque tube and extending along the axial length of the torque tube, wherein the bar spline includes a race surface disposed at the radially inner surface of the cable drum and wherein the bar spline includes a rod extending parallel to the longitudinal axis, the rod having a circular cross section and disposed within the mount.

2. The hoist of claim 1, wherein the bar spline is a first bar spline from among a plurality of bar splines spaced about the radially outer surface of the torque tube and the race surface is a first race surface from among a plurality of race surfaces spaced about the radially inner surface of the cable drum.

3. The hoist of claim 1, further comprising a level wind mechanism configured to translate the cable drum back and forth with respect to the longitudinal axis, the level wind mechanism including a first screw and a second screw.

4. The hoist of claim 3, wherein the first screw and the second screw are secured to the radially outer surface of the torque tube.

5. The hoist of claim 4, further comprising a follower threadedly engaged with the first screw and the second screw and coupled to the radially inner surface of the cable drum.

6. A method of hoisting a cable, comprising:

engaging a radially outer surface of a torque tube with a radially inner surface of a cable drum using a bar spline disposed radially outward of the torque tube and radially inward of the cable drum; and transferring a torque from the torque tube to the cable drum via the bar spline to wind or unwind the cable disposed about the cable drum, wherein the bar spline includes a mount attached to the radially outer surface of the torque tube and extending along an axial length of the torque tube, wherein the bar spline includes a race surface disposed at the radially inner surface of the cable drum and wherein the bar spline includes a rod extending parallel to the longitudinal axis, the rod having a circular cross section and disposed within the mount.

7. The method of claim 6, further comprising translating the cable drum back and forth with respect to a longitudinal axis via a level wind mechanism having a first screw and a second screw secured to the radially outer surface of the torque tube.

8. The method of claim 7, wherein a follower is threadedly engaged with the first screw and the second screw and coupled to the radially inner surface of the cable drum.

9. A rescue hoist, comprising:

a torque tube defining a longitudinal axis and having a radially outer surface;

a cable drum having a radially inner surface;

a bar spline disposed radially outward of the torque tube and radially inward of the cable drum and configured to transfer a torque from the torque tube to the cable drum; and a level wind mechanism configured to translate the cable drum back and forth with respect to the longitudinal axis, wherein the bar spline includes a mount attached to the radially outer surface of the torque tube and extending along an axial length of the torque tube, wherein the bar spline includes a race surface disposed at the radially inner surface of the cable drum and wherein the bar spline includes a rod extending parallel to the longitudinal axis, the rod having a circular cross section and disposed within the mount.

* * * * *